United States Patent [19]
de Villeneuve et al.

[11] Patent Number: 5,259,909
[45] Date of Patent: Nov. 9, 1993

[54] SYSTEM AND METHOD FOR THE CHECKING OF A REACTIVE PLASMA MACHINE

[75] Inventors: Thierry de Villeneuve; Bernard Domergue, both of Aix En Provence, France

[73] Assignee: SGS-Thomson Microelectronics S.A., Gentilly, France

[21] Appl. No.: 998,780

[22] Filed: Dec. 29, 1992

Related U.S. Application Data

[63] Continuation of Ser. No. 810,380, Dec. 19, 1991, abandoned.

[30] Foreign Application Priority Data

Dec. 21, 1990 [FR] France ................. 90 16079

[51] Int. Cl.⁵ ............... H01L 21/306; B44C 1/22; C03C 15/00; C03C 25/06
[52] U.S. Cl. ........................ 156/345; 156/627; 156/643; 364/131; 364/138; 364/496
[58] Field of Search ............... 204/192.13, 192.33, 204/298.03, 298.32, 298.33; 118/712; 427/8, 10, 11; 364/131, 133, 136, 138, 468, 469, 500, 496; 156/626, 627, 643, 657, 662, 345

[56] References Cited

U.S. PATENT DOCUMENTS 4,736,304 4/1988 Joachim .................. 364/469

FOREIGN PATENT DOCUMENTS 0276937 8/1987 European Pat. Off. .

Primary Examiner—William A. Powell
Attorney, Agent, or Firm—Robert Groover

[57] ABSTRACT

The selection of a formula by an operator on an independent reactive plasma machine using a certain number of reactive gases is checked by making a comparison, at a given instant, between the required flow-rate and the real flow-rate obtained, in associating a false parameter of the flow-rate of the gas with each formula memorized in the machine and by integrating, into the machine, a simulator of a flow controller of this gas which knows false the parameter of the flow-rate associated with the formula that should have been chosen by the operator, and responds with this parameter to the machine which asks for the real flow-rate of this gas.

28 Claims, 2 Drawing Sheets

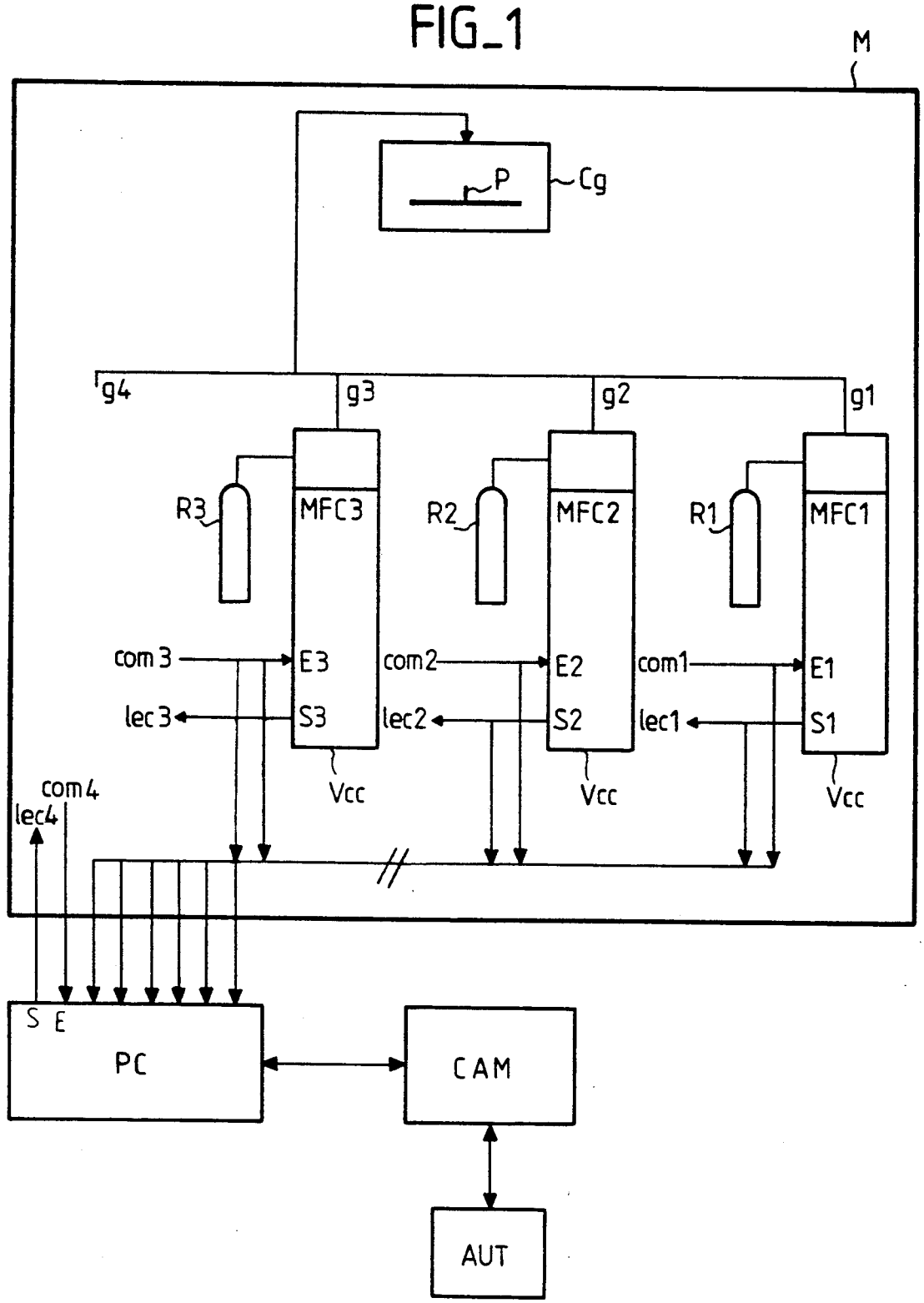
FIG_1

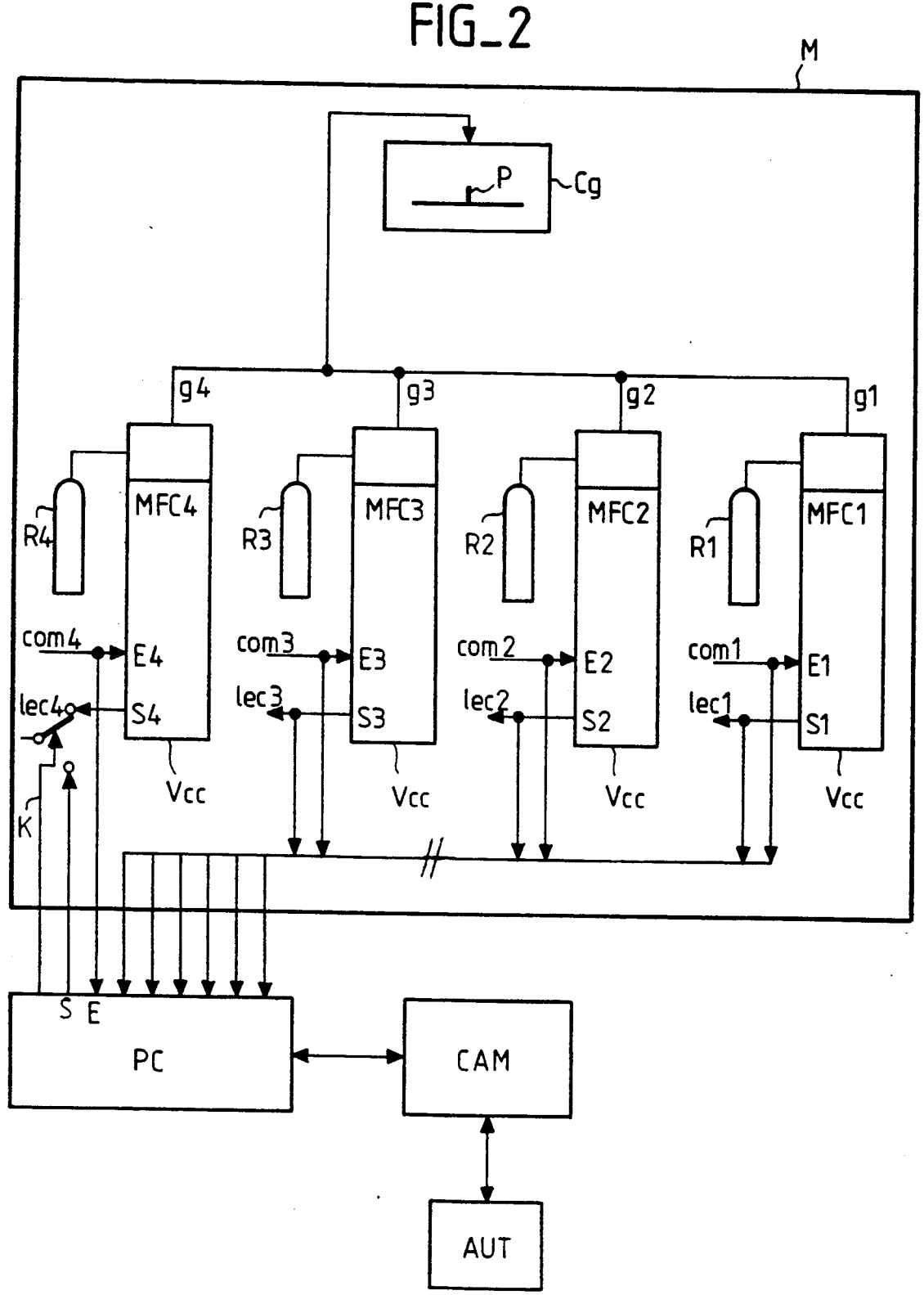
FIG_2

SYSTEM AND METHOD FOR THE CHECKING OF A REACTIVE PLASMA MACHINE

This is a continuation of application Ser. No. 07/810,380, filed Dec. 19, 1991, now abandoned.

BACKGROUND OF THE INVENTION

1. Field of the Invention

The disclosed inventions provide modification of an independent reactive plasma machine to enable checking the validity of the program selection on this machine by means of a central computer. For example, the invention can be applied to reactive plasma etching machines in a semiconductor production line.

2. Description of the Prior Art

In the industrial-scale manufacturing of semiconductors, there are limitations in the performance characteristics of the work stations of independent reactive plasma machines. One cause of these limitations arises out of the fact that it is necessary for a human operator to select and launch a program on a machine, or even to load the machine with a batch of silicon wafers or slices. The operator only has to make one error, and the entire batch is lost: it is scrapped. Moreover, it may happen that the error cannot be identified at once, and this batch will then continue to be processed unnecessarily.

In the invention, it is sought to obtain the ability to ascertain whether the operator has made a mistake, and, if an error has occurred, to place the machine in error mode before the plasma operation has been started and save the batch, or else to immediately identify the batch to be scrapped.

Now, in one aspect of the automation of production lines, it is sought to manage all the machines of a production line by means of a central CAM (Computer Aided Manufacturing) computer. This computer tracks each batch to be processed. It should not only provide for the synchronization of the various operations for manipulating the batches of wafers, but also control all the manufacturing parameters of the machines.

Since this approach is a novel one, only the new manufacturing machines can be integrated into an automated environment such as this. In particular they have, for this purpose, the interfaces needed to communicate with the central computer according to a determined, even a standardized, communications protocol.

The older machines, designed from a viewpoint of autonomy, cannot be integrated by the user into an environment such as this: they have neither the basic software nor the necessary interfaces, and cannot be adapted to the communications protocol. Only the manufacturer of such a machine could carry out such a major and costly conversion. The manufacturer prefers to develop entirely new machines.

However, since the central computer for the management of a production line has to track a batch at each step of processing, the following procedure is followed:
an operating sheet is associated with each batch;
at a given step, for a processing of the batch by such an independent machine, the operator will provide the central computer with information on the identification number of the batch;
in return, the computer indicates the formula that has to be selected on the independent machine;
the operator selects the formula and loads the batch into the machine.

If the operator makes a mistake, the computer cannot check this (much less take action), and the batch will be lost.

Now, the operator may indeed:
make a mistake about the batch number,
make a mistake about the operating sheet,
make a mistake of selection on the machine,
when a batch is divided, for example between two trays, make a mistake about the tray to be loaded (for example, one and the same tray may undergo the same processing operation twice, and the other one will not be subjected to it).

In any case, the batch will be lost for manufacture. If the error is not detected immediately, it will be necessary to wait for the checks on the batches at the end of manufacture, which will make it possible to identify the batch to be scrapped. In practice, these human errors significantly reduce the output of the manufacturing line.

A first aim of the invention is to check the selection of the formula on an independent reactive plasma machine for example a machine for the plasma etching of silicon wafers, and more generally a machine using fluids, the flow of the fluids being controlled. A fluid is taken to mean a liquid, a gas or even solid particles conveyed by a liquid or gaseous flux.

In a machine for the plasma etching of silicon wafers for example, a formula consists in determining the different parameters that govern the etching cycles.

These chief parameters are:
the reactive gases which will form the reactive plasma in the etching chamber;
their respective flow rate;
their pressure;
the radio-frequency power to be applied, to cause the etching by reactive plasma;
the time of duration parameters;
the parameters determining the end of the etching cycle (the light intensity in the spectral lines chosen).

An etching cycle generally comprises the following phases:
1. The loading of a wafer into the etching chamber.
2. The pumping of the gases
3. The stabilization of the flow-rates and pressures of the reactive gases
4. Plasma etching
5. The pumping of the residual gases
6. Removal of the wafer
7. At the end of the processing of the batch: the cleaning of the vacuum chamber (repeat of phases 2 to 6) and/or purging of the gas lines with a neutral gas (N2).

Each gas container is controlled by a mass flow controller that opens the valve of the container to varying degrees, according to the command that it receives from the machine:
a command for complete opening or complete closing, in the purging phase;
a command for opening to x%.

At the end of the stabilization phase, which typically lasts 60 to 90 seconds, the machine makes a check on the flow-rate of the gases. In principle, this check is ended before the start of the plasma etching.

Each flow controller receives a flow-rate command from the machine and gives the machine the real flow-rate value. A flow controller therefore has a control input and a reading output, which are connected to the machine.

In practice, these are commonly analog input/output ports. Thus, an x flow-rate command will correspond to an analog voltage with an amplitude of x% of the supply voltage Vcc of the controller, received at the control input of the flow controller.

During the gas flow-rate checking phase, each flow controller therefore receives a flow-rate command, in practice an analog voltage of x% of Vcc. Each flow controller sends the value corresponding to the opening of the valve to its analog output, this value being the value of the real flow-rate that is read by the machine. The machine can thus ascertain that the gas is really circulating between the container and etching chamber.

Indeed, if the response (real flow-rate) is different from the flow-rate parameter in the formula selected by the operator, it means that the gas is circulating badly. The machine, which should make the response of the flow controller agree with the parameter of the selected formula before setting off the plasma etching process, then goes into error mode and removes the wafer from the chamber, and the operator unloads the batch or tray of wafers from the machine.

However, in a certain number of machines, it is necessary for this difference to be truly significant: for machines such as these having high tolerance values, an error of 10% or 20% for example may be tolerated.

SUMMARY OF THE INVENTION

In the invention, a modification is made in a parametrized part of the application software of an independent machine using fluids, the flow of the fluids being controlled in an operation of the machine. Namely the modification is made in the memorized formulae, without touching the basic software of the machine manufacturer.

In the invention, each formula of the machine is modified to introduce a false flow-rate parameter, the value of which biuniquely identifies the formula, and a means is used to simulate a flow controller which knows the false parameter value associated with the formula that the operator ought to have selected. If the operator has made a mistake, there will be no equality between the false parameter associated with the formula that the operator has selected and the false parameter value associated with the formula that the operator ought to have selected. The machine will go into error mode. The batch will be saved. Thus, a function for checking the machine, dedicated to the checking of the proper circulation of the gases, is diverted into a function for checking the selection of formulae.

The simulation means is preferably connected to the central computer which, for its part, indicates this value of the false parameter of the formula that the operator should have selected. In the invention, the false controller thus creates an indirect link between the machine and the computer.

In the invention, the false flow controller is intelligent, so as to be capable of interpreting the commands of the machine and of engaging in dialog with the central computer.

In the invention, in an application to a machine for the plasma etching of silicon wafers, the false flow controller analyzes the number of commands that it receives from the machine, to determine each of the etching steps and to determine the number of wafers treated. It transmits this information to the computer.

In a first checking system according to the invention, an additional gas line is introduced into the formula, the associated gas being fictitious (with no corresponding container). And, to this gas line, there corresponds, in the formula, a flow-rate parameter, the false parameter, the value of which will determine the selected formula biuniquely. This first checking system is, however, applicable only in a machine wherein at least one gas line is not used operationally.

One improvement of the invention consists in making a comparison between the flow command of the machine and the false parameter transmitted by the computer by the simulating means. Except for the analog conversion error, which depends on the characteristics of the converter chosen (resolution, precision), an absolute comparison is made, without any interval of tolerance.

If the simulating means discovers a difference, a first approach consists in sending back to the machine, in reading mode (on lec4), a value that diverges sharply from the command received on com4, for example with a difference of plus or minus 50% or 80% of Vcc. Thus it is certain that, irrespectively of the tolerance of the machine, it will be made to go into error mode and hence to stop the processing of the batch.

Another approach consists in using an output of the simulating means to set off a priority error in the machine that makes it stop instantaneously. For example, this would be an output that cuts off the response of a priority control sensor, like that of the cooling circuits of such machines.

In both these cases, it is certain that even a machine with high tolerance as regards the checking of the flow rates will go immediately into error mode upon the detection of an error in the selection of the formula through the simulating means, before the triggering of the reactive plasma.

In a second checking system according to the invention, an additional etching cycle is added to all the formulae, without controlled radio-frequency, so as not to set off the plasma etching process. For the stabilization phase of this additional cycle, the flow-rate parameters of all the gases except that of a determined gas have the same value in each formula, and the combination that they form is not used in any of the formula to achieve a true etching plasma. The parameter of the flow-rate of the determined gas (g4 in FIG. 2), for its part, takes a different value in each formula: it is the false parameter. The simulating means detects the additional stabilization in a formula, in recognizing the combination of the flow-rate parameters of the other gases, and then take the place of the flow controller of the determined gas to give a response indicating, as the real flow-rate, the value of the false parameter of the formula that the operator should have selected.

An object of the invention, therefore, is a system for the checking of a machine that uses fluids, each fluid having its flow controlled by an associated flow controller, a flow controller having an input to receive a flow command on an associated control line of the machine and an output to deliver the real flow on a reading line of the machine, said machine being one in which formulae are memorized and in which an operator selects one formula among the formulae memorized in the machine, said formula indicating the fluids used and their flows for the different phases of the manufacturing step, and said machine controlling, in a stabilization phase, the flow of each fluid used at the input of the associated flow controller, said machine reading the real flow of each fluid used at the output of the flow controller and going into error mode if, for a fluid used, the commanded flow and the real flow read are different; said checking system being one wherein a false flow parameter is added to each of the formulae memorized with a different value for each of the formulae memorized, and wherein a means to simulate a flow controller receives, during a stabilization phase, this false flow parameter as a commanded flow on an associated control line of the machine and delivers, at output, a real flow value corresponding to the false flow parameter associated with a formula that the operator should have selected.

BRIEF DESCRIPTION OF THE DRAWINGS

Other features of the invention are described in the following invention, given by way of a non-restrictive example and made with reference to the appended drawings, of which:

FIG. 1 shows a first checking system according to the invention;

FIG. 2 shows a second checking system according to the invention.

MORE DETAILED DESCRIPTION

A first checking system is shown in FIG. 1. It can be applied to machines that do not make use, in operation, of all the fluid lines that they are capable of managing. In the example, the machine M is a machine for plasma etching of silicon wafers capable of managing four gas lines g1 to g4, but makes use, in operation, of only three of them, g1 to g3. The gas lines enter the etching chamber Cg in which a wafer p to be processed is deposited on a tray or support. Each gas line gi used is checked by a flow controller MFCi (i∈ [1,3]).

Each MFCi used operationally is connected to a gas container Ri and checks the opening of the valve of the container. FIG. 1 schematically represents the gas containers R1, R2 and R3 associated with the controllers MFC1, MFC2 and MFC3.

Each MFCi (Mass Flow Controller) for i=1 to 3 is controlled at the control input Ei by a control line comi of the machine and checked at a reading output Si by a reading line leci of the machine.

An MFCi can thus receive a flow-rate x command from the machine at its input Ei and respond at its output with the real flow-rate.

For example, these information elements are analog voltages. In this example, a flow-rate x command may be expressed in the form of a percentage with respect to the supply voltage Vcc of MFCi (x% of Vcc).

In the invention, the control line com4 and checking line lec4 of the machine for the gas line g4 that is not used in operation are connected respectively to an input E and an output S of a means to simulate a controller (PC). This means is intelligent. It has a microprocessor, memory and input/output interfaces.

In particular, it has digital/analog and analog/digital converters (not shown) to read and write at the input E and output S.

This means to simulate a flow controller further has an interface for communications with a CAM computer: this interface is, for example, a series link.

In the spirit of the invention, the CAM computer is the one that controls the production line: it controls machines designed as automatons and follows the different manufacturing steps of the different batches of semiconductor wafers. An automaton (AUT) controlled by it, of this kind, is shown in FIG. 1. For independent machines, the computer is informed by the operator on the number of the batch to be treated, and the computer determines the formula to be selected on the machine. The operator will then select the formula on the machine, for example on a screen of the machine having sensitive keys (not shown).

In the invention, the formulae of the independent machines that do not use all their gas lines are converted: for, an additional gas line to be managed is added to these formulae, even though this gas line (g4 in FIG. 1) is not actually connected to a gas container. With this fictitious gas, therefore, there is particularly associated a flow-rate parameter: this is the false parameter of the invention.

In the example of FIG. 1, it is the gas g4 that is fictitious.

Since this line of fictitious gas is declared as being used in the modified formula, the machine M will command, on com4, the flow-rate read in the formula and will read the real flow-rate on lec4.

In the invention, it is thus the simulating means that reads the control line com4 of the machine and responds to it on the reading line lec4.

In the machine, when a command on the flow rate of the fictitious gas, other than a command for full opening or closing, is sent by the machine M, the simulation means responds to the machine by giving, as the value of the real flow-rate of the gas g4, the value of the false parameter of the formula that the operator should have selected. Preferably, this value will have been sent beforehand by the computer before the start of the processing of the batch.

If this response of the simulating means differs from the flow-rate commanded by the machine, i.e. the flow-rate indicated in the formula selected by the operator, it means that the operator has made a mistake. This check is done normally at the end of the stabilization phase of the gases, before the sending of the radio-frequency for setting off the plasma operation.

If the machine detects an error at the end of the stabilization phase, it goes into error mode and removes the wafer from the etching chamber, and the operator unloads the tray from the machine: all the wafers are saved, including the one in the machine, since the plasma operation has not been set off.

If we had taken the example of a reactive gas machine that processes several wafers at a time, all these wafers would have been unloaded and saved.

When a command for full opening or full closing is sent, the simulating means responds by giving, as the real flow-rate value, a value corresponding to complete opening or complete closing. Indeed, these commands correspond to the phase for purging the chamber, between each batch to be treated. This phase, which is independent of the formula used, is necessary to go on to the processing of the next batch.

The simulating means preferably consists of a PC (personal computer) or a computer workstation. With standard equipment such as this, it is easy to provide for the different interfaces, namely interfaces with the machine and with the computer.

Indeed, input/output interfaces for PCs (or workstations) are commercially available in large quantities to meet every need of the user. It is thus easy to adapt to every type of possible interface of the machine. The PC is a type of equipment of standard and flexible use.

In the invention, all that has to be specifically done is to develop the means for managing the dialog protocol between the simulating means and the computer, and the simulation software (for reading/writing on the interfaces with the machine, and analysis of the commands), and to modify the formulae memorized in the machine to declare a supplementary gas line and the associated flow-rate parameters. All these considerations show the lower cost of making a conversion of this kind as compared with that of purchasing a new machine, even if it enables only the a posteriori checking of an operator's choices, with the recovery of a batch, and not a total checking of the machine by the central computer.

In the invention, the analysis of the commands of the machine by the simulating means also makes it possible to count the etching cycles performed: there are as many etching cycles as there are, for example, flow-rate commands other than those relating to complete opening and complete closing (with only one purging phase per batch). Thus, it is possible to deduce the number of processed wafers therefrom. Since the computer, which is following the batch, has precise knowledge of the number of wafers of the batch processed, by comparison with the number computed that has been transmitted to it by the simulating means, it may trigger an alarm if there is no equality: the error is detected immediately. The batch is lost, since this error is detected only at the end of the processing of the batch, but this prevents it from continuing to be processed in the production line; thus money is saved. Furthermore, in certain cases, it will nevertheless be possible to recover the batch.

Advantageously, all the inputs/outputs of all the controllers are shunted to inputs of the simulating means. This simulating means then acts as a spy and can analyze all the commands and responses of the controllers. It can thus detect any anomaly. It is also possible to spy on the status lines of the machine by shunting these lines to the inputs of the PC (and by incorporating, in the PC, the appropriate interface card).

However, it has also been seen that certain machines can have very high tolerances in the checking of the flow-rates. Now, in the invention, the flow-rate of the gas g4 assumes a different value for each formula, this formula being a percentage of Vcc other than 0 (complete closing) and 100% of Vcc (complete opening). For a machine that has many formulae, the difference between two flow-rate values of g4 could then be small, for example smaller than 10% of Vcc. If, for this checking of the flow-rates, the machine has a tolerance of over 10% of Vcc, it will detect no error of comparison.

An improvement of the machine then consists in causing the comparison to be made between the flow-rate command of the machine and the false parameter transmitted by the computer by the simulating means. Except for the analog conversion error which depends on the characteristics of the converter chosen (resolution, precision), an absolute comparison is made, without any tolerance interval.

If the simulating means finds a difference, a first approach consists in making it send back to the machine, in reading mode on lec4, a value that diverges sharply from the command received on com4, for example with a difference of plus or minus 50% to 80% of Vcc, so as to go beyond the tolerance of the machine. Thus it is certain that, irrespectively of the tolerance of the machine (for example 10% or 20% of Vcc), it will be made to go into error mode and hence stop the processing of the batch of silicon wafers.

Another approach consists in using an output of the simulating means to set off a priority error in the machine that makes it stop instantaneously. For example, this would be an output that cuts off the response of a priority control sensor, like that of the cooling circuits of such machines.

In both these cases, it is certain that even a machine with high tolerance as regards the checking of the flow rates will go immediately into error mode upon the detection of an error in the selection of the formula through the simulating means, before the reactive plasma operation is set off.

A second checking system according to the invention is shown in FIG. 2 (the references of FIG. 1 are used to designate the same elements). It makes it possible, in particular, to resolve the case where, in operational mode, the machine uses all the available gas lines. In this embodiment, all the inputs Ei of the controllers are shunted to the inputs of the PC. And the reading line of the machine towards one of the controllers lec4, towards the controller MFC4 in FIG. 2, may be switched over either to the output S4 of FIG. 2 or to an output S of the PC. The switch-over command K is provided by the PC.

In the invention, the formulae of the machine are modified by adding an additional etching cycle, without controlled power for the plasma, so as not to set off the plasma etching operation in this cycle. For the stabilization phase of this additional cycle, the flow-rate parameters of all the gases, excepting that of a determined gas, have the same value in each formula: the combination that they form is not used in any formula to make a true etching plasma. The flow-rate parameter of the determined gas (g4 in FIG. 2) for its part takes a different value in each formula: it is the false parameter.

For, in this second checking mode, the PC recognises the stabilization phase of the additional cycle by the analysis of the control inputs of the other MFC1: E1 and E3 in the example. The additional phase corresponds, for example, in all the formulae, to the following combination of the flow-rate commands: E1=20 and E2=20 and E3=20.

This combination is the same for all the formulae and does not correspond to any reactive plasma used in operational mode. This combination read by the PC enables it to recognize the stabilization phase of the additional cycle in any formula whatsoever. It then switches over the reading line of the machine lec4 to its output S. The PC then responds by giving, as a real flow-rate of the gas g4, the value of the false parameter of the formula that the operator should have selected.

If there is no correspondence with the false parameter of the selected formula in the machine, it means that the operator has made a mistake.

Here again, there is a one-to-one correspondence between the formula and the value of the false parameter.

As in the first embodiment, it is possible to count the wafers, analyze the entire progress of the formula in spying on the output of the controllers, etc. These advantages shall therefore not be referred to again.

The improvement seen for the first embodiment is also applicable to the second mode.

It will be easily understood that the invention can be applied more generally to machines using fluids, the flow-rate or pressure of which is controlled and, more generally, the flow of which is controlled by a flow controller. A fluid is taken to mean a liquid, a gas or even solid particles conveyed by a liquid or gaseous flux.

What is claimed is:

1. A system for the checking of a machine that uses fluids, each fluid having its flow controlled by an associated flow controller, a flow controller having an input to receive a controlled flow on a control line of the machine and an output to deliver a real flow on a reading line of the machine, said machine being one in which formulae are memorized and in which an operator selects one formula among said memorized formulae, said selected formula indicating the fluids used and their controlled flows for a manufacturing step, said machine imposing in a stabilization phase for each fluid used, the associated controlled flow at the input of the associated flow controller, said machine reading at the end of said stabilization phase and for each fluid used, the associated real flow at the output of the associated flow controller, said machine going into error mode if the associated controlled flow and real flow of a fluid used are different; said checking system being one wherein a false flow parameter is added to each of the memorized formulae with a different value for each of the memorized formulae, the machine imposing during said stabilization phase said false flow parameter as a controlled flow to a means to simulate a flow controller, said means to simulate a flow controller delivering at output a real flow value corresponding to the false flow parameter associated with a formula that the operator should have selected.

2. A checking system according to claim 1 wherein, for all the formulae memorized, the false flow parameter is associated with a fluid not used in the manufacturing step of the machine and wherein each memorized formula is modified so that this fluid is declared to be used with, as a flow value, a different value in each formula.

3. A checking system according to claim 2 wherein, upon the receiving of a controlled flow with a complete opening or complete closing value respectively, corresponding to this fluid not used in the manufacturing step, the simulating means sends back, as a real flow of this fluid, a complete opening or complete closing value respectively.

4. A checking system according to claim 1, for a machine for plasma etching of silicon wafers, using reactive gases as fluids.

5. A checking system according to claim 4, wherein an etching cycle in which the plasma etching operation is not set off, is added in the manufacturing step, and corresponding flow parameters for the reactive gases are added in each of the memorized formulae, the false flow parameter being the flow parameter for said etching cycle of a first one of the reactive gases, with a different value in each of the memorized formulae, the combination formed by the flow parameters of the other reactive gases for said etching cycle being the same in all the formulae, and the means to simulate receiving all the controlled flows imposed at input of each of the flow controllers so as to recognize the combination of the flows of the other reactive gases and then take the place of the flow controller associated with the first reactive gas during the stabilization phase of said etching cycle.

6. A checking system according to claim 1, wherein the simulating means includes a microprocessor.

7. A checking means according to claim 1, wherein the simulating means further includes a communications interface with a central computer that knows which formula the operator ought to have selected and sends the simulating means the false flow parameter corresponding to said formula that the operator ought to have selected.

8. A checking system according to claim 1, used for a plasma etching machine to process batches of silicon wafers.

9. A checking system according to claim 8, wherein the simulating means sends the computer the number of etched silicon wafers of a batch processed by the machine.

10. A checking system according to claim 7, wherein the simulating means sends the computer information on the status of the machine.

11. A checking system according to claim 1, wherein the simulating means makes a comparison between the controlled flow value it receives at input and the value of the false parameter of the formula that the operator should have selected and wherein the real flow value that it delivers at output in the event of a difference is a value that is very different from said controlled flow received.

12. A checking system according to claim 1, wherein the simulating means makes a comparison between the controlled flow and the false parameter of the formula that the operator should have selected and, in the event of a difference, prompts a priority error in the machine to alert a safety element of the machine.

13. A system for checking the operation of a programmable flow-controlling machine, comprising:
a programmable machine having a program input for receiving program commands from an operator, and being connected to write commanded flow values and to read corresponding monitored flow values on multiple input/output connections, and being configured to activate an error condition if the difference between one of said commanded flow values and the corresponding monitored flow value is not within a predetermined error tolerance;
one or more flow controllers each connected to receive a commanded flow value from said machine and to output a corresponding monitored flow value to said machine;
a simulator which is also connected to receive at least one commanded flow value from said machine and to output a monitored flow value to said machine; wherein said simulator is connected to compare said commanded flow value with a nonphysical flow value, and to provide a data signal on said monitored flow value accordingly.

14. The system of claim 13, wherein said simulator is also connected, via an additional data interface, to a central computer.

15. The system of claim 13, wherein said simulator is connected to create a priority error condition in said machine if an incorrect value is detected for said nonphysical flow value.

16. The system of claim 13, wherein said simulator is configured to make said data signal on said monitored flow value substantially equal to said commanded flow value if said commanded flow value is equal to said fictitious flow value, and otherwise to make said data signal on said monitored flow value significantly different from said commanded flow value.

17. The system of claim 13, wherein said simulator is also configured to keep an accumulated count of the number of times a signal is received for said commanded flow value.

18. The system of claim 13, wherein said simulator comprises a PC computer.

19. The system of claim 13, wherein said simulator is connected to a respective one of said input/output connections which is not connected to any of said flow controllers.

20. The system of claim 13, wherein said simulator is connected, to a respective one of said input/output connections, in parallel with a respective one of said flow controllers; and further comprising switching logic which is connected to detect the presence of a predetermined combination of values for said monitored values, and to disconnect said respective one of said flow controllers from said respective input/output connection.

21. The system of claim 13, wherein said machine is a plasma reactor, and each said flow controller is a mass flow controller for gasses.

22. A method for operating a flow-controlling machine in a batch manufacturing process, comprising the steps of:

(a) under direct control of a human operator, inputting parameter sets for individual workpiece batches into a programmable machine; said parameter sets including at least one nonphysical value;

(b) said programmable machine thereafter, in accordance with said programming commands, writing commanded flow values and reading corresponding monitored flow values to one or more flow controllers, and activating an error condition if the difference between one of said commanded flow values and the corresponding monitored flow value is not within a predetermined error tolerance; said programmable machine also being connected to provide a respective commanded flow values to, and read a monitored flow values from, a simulator;

(c) comparing, in said simulator, said respective commanded flow value with a fictitious flow value which is not a physical flow value, and providing a data signal back to said machine, as a monitored flow value, accordingly; and (d) activating, in said machine, an error condition whenever the difference between one of said commanded flow values and the corresponding monitored flow value is not within a predetermined error tolerance;

whereby said data signal provided by said simulator triggers an error condition whenever an incorrect parameter set has been loaded in said step (a).

23. The method of claim 22, wherein said step (a) also comprises loading one or more workpieces into said machine.

24. The method of claim 22, wherein, in said step (c), said simulator also communicates with a central computer over an additional data link.

25. The method of claim 22, wherein, in said step (c), said simulator is configured to make said data signal on said monitored flow value substantially equal to said commanded flow value if said commanded flow value is equal to said fictitious flow value, and otherwise to make said data signal on said monitored flow value significantly different from said commanded flow value.

26. The method of claim 22, wherein said simulator also keeps an accumulated count of the number of times a signal is received for said commanded flow value.

27. The method of claim 22, wherein said simulator is connected, to a respective one of said input/output connections, in parallel with a respective one of said flow controllers, and further comprising switching logic which is connected to detect the presence of a predetermined combination of values for said monitored values, and to disconnect said respective one of said flow controllers from said respective input/output connection.

28. The method of claim 22, wherein said machine is a plasma reactor, and each said flow controller is a mass flow controller for gasses.

* * * * *